Sept. 24, 1935.  W. McQUADE  2,015,084
STRUCTURAL UNIT WITH VEINED SURFACE
Filed May 7, 1932
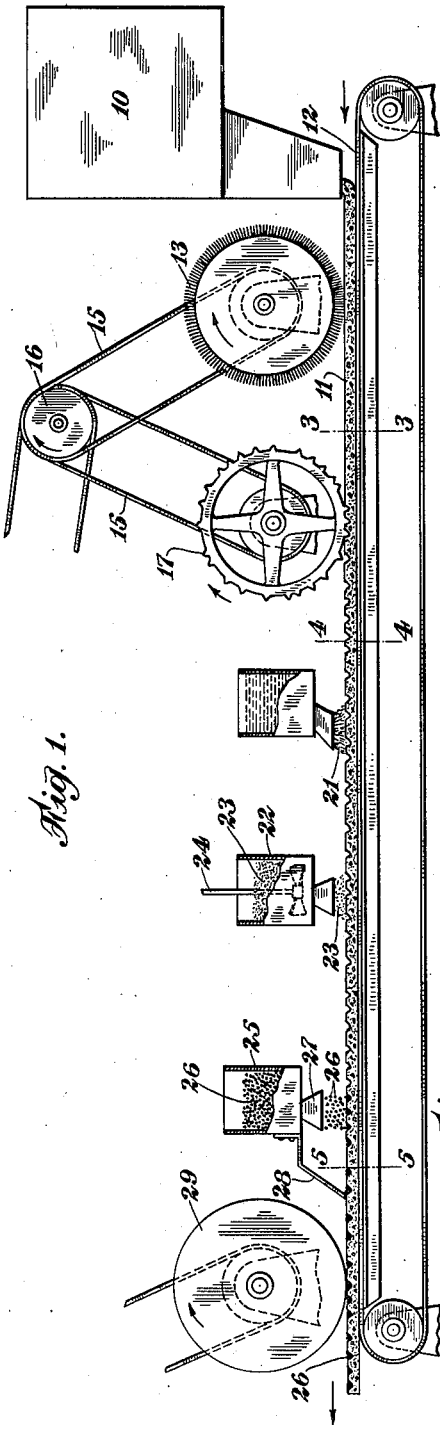
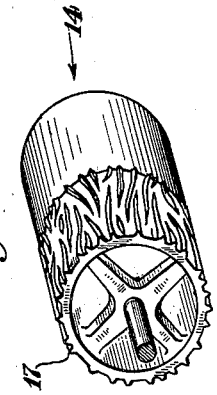
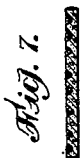
INVENTOR
Walter McQuade.
BY
ATTORNEY Patented Sept. 24, 1935

2,015,084

UNITED STATES PATENT OFFICE 2,015,084

STRUCTURAL UNIT WITH VEINED SURFACE

Walter McQuade, Port Washington, N. Y., assignor to Johns-Manville Corporation, New York, N. Y., a corporation of New York Application May 7, 1932, Serial No. 609,851

4 Claims. (Cl. 108—8)

The present invention relates to a unit of structural material with veined surface, and particularly to a rigid shingle provided with veins of color that is different from that of the matrix. The invention pertains especially to such shingles that are made from a composition that is plastic or readily deformable at one stage of the process of manufacturing the shingles.

The products of the invention may be made by providing depressions, suitably elongated indentations or corrugations in the surface of a band, containing a mixture of fibers and hydraulic cementitious material, for example, while the mixture is in readily deformable state, wetting the band, filling the depressions, in part at least, with particles such as granular slate of selected color, and then densifying and hardening the material.

Rigid shingles prepared from a mixture of Portland cement and asbestos fibers, either in presses or in machines of a type and by a process similar to that described in U. S. Patent 979,548 to Norton, dated December 27, 1910, are illustrative of the products and materials to which this invention has been successfully applied, and the invention is specifically described hereinafter with reference to such products. Such shingles may contain various proportions of Portland cement to short asbestos fibers, as, for example, 1.7 to 2.2, suitably 1.9 parts by weight of the cement to 1 part of asbestos. Also, the shingles may contain admixed coloring material, such as lamp black, and/or a veneer of coloring materials, such as pigments, adhered to a face of the shingle by means of a cementitious material. Thus a veneer of Portland cement and burnt umber, chrome green, yellow oxide, and/or the like, may be applied to the top surface of a part or all of the band or sheet of the mixture of the other shingle ingredients and firmly adhered to the said band or sheet, as by subsequent pressing and hardening operations. The veneer may establish a uniform color over the part of the sheet to which the veneer is applied.

My improved products, as well as a method of producing them, are illustrated in the accompanying drawing in which Fig. 1 shows diagrammatically an assembly of an apparatus suitable for use in the manufacture of the products of the invention.

Fig. 2 is a perspective view of the rotary die provided with a molding surface adapted to produce depressions in the surface of the readily deformable mixture of Portland cement and asbestos fibers.

Figs. 3 to 5 inc. are end views of segments of the sheet material as it travels along the conveyor and illustrate the condition of the sheet obtaining at the stages indicated by the several lines 3—3, 4—4, and 5—5, of Fig. 1.

Figs. 6 and 7 are a perspective and a sectional view on line 7—7, of Fig. 6, respectively, of a shingle made in accordance with the invention.

In the device shown in Fig. 1, a hopper 10 is provided for feeding a dry mixture of a suitable hydraulic cementitious material, such as Portland cement, and a reenforcing fibrous material, such as asbestos, onto a continuously advancing conveyor 12. A picker roll 13 of a conventional type serves to brush off excess material and leaves the sheet or band 11, comprising the mixture of cementitious and fibrous material, emerging therefrom of selected thickness and plane surfaces, as indicated in Fig. 3. The sheet at this stage is readily deformable. It passes between side guides (not shown) to true up the edges. The sheet is next subjected to the action of the rotary die 14 provided with a molding surface 17 which impresses the desired depressions, suitably elongated, irregular indentations, on the sheet and, at the same time, slightly compresses the material and makes it more dense below the depressions than below the elevations. Die 14, shown in detail in Fig. 2, is specially adapted for the production of shingles such as illustrated in Figs. 6 and 7, wherein the irregularities of appearance of the surface are confined to the portion of the shingle exposed to view when laid in a finished structural assembly, such as a roof. The pattern illustrated imparts to the shingle a grooved surface. The grooves may be arranged in a pattern similar to that of the grains in wooden shingles or timbers. Also, the shingle may be colored, by conventional means, as will appear later, with materials that impart a color resembling weathered wood to the surface of the shingle that is to be exposed in a structural assembly.

Die 14 and picker roll 13 are rotated by any usual means, such as belts 15 from pulley 16.

The sheet next passes under a water spray 21 of the usual type for applying sufficient water to the sheet to hydrate the cement, the water thus applied being quickly absorbed in the porous mass.

The wet sheet provided with grooves or indentations then passes under a vessel 22 containing a colored veneer composition 23, suitably kept suspended in water by an agitator 24 driven by convenient means. The veneer may be applied only to the portion of the sheet that is to constitute the portion of shingles exposed to view when placed in an assembly, such as a roof. The veneer may contain the usual shingle veneer ingredients, such as Portland cement and pigments and/or dyes.

The sheet passes next under a vessel 25 containing colored particles 26, such as granular tile or slate, and provided with a hopper or sieve 27, for feeding the particles onto the sheet. The particles fall largely into the depressions.

Various substances may be utilized for the colored particles, the important requisites being that they are not affected by exposure to air, rain, or changes in atmospheric temperature and that they appear differently from the matrix of Portland cement and asbestos, as the matrix exists on the surface, that is, when the surface of the matrix is either colored or not colored. Hard, bright flakes have been used by me to advantage. While such flakes should differ in color from the surface of the matrix, for best effects, the color of flakes preferred, for use with a given color of matrix, is one that harmonizes with the color of the matrix.

The feed of the colored particles from the hopper may be produced by vibrating the container 25 or by other conventional means. Apron 28 serves to level off the particles in such manner that they fill the depressions, at least in part, and, suitably, substantially completely. Those particles that are left on the elevations and are not removed therefrom in subsequent operations remain as intermediate particles 33 in the finished shingle. These intermediate particles, in spaced relationship to each other and in positions between the veins, are useful in adding to the general color scheme.

The sheet with the surface thus treated next passes under a compression roll 29 which partially compacts the sheet and pushes into the depressions some of the colored particles that may still remain lodged on the high spots of the sheet.

Both compression roll 29 and die 14 may be arranged with their axes at a slight angle with respect to the plane of the conveyor 12, so that sheet 11 is thereby tapered in a transverse direction, the thick butt portion coinciding with the ornamented surface, as indicated in Fig. 6.

The sheet is then severed by crosswise cutting into segments, which are usually somewhat larger than the size desired for the finished shingle. The segments are stacked in piles with a flat metal plate of plane surface between adjacent segments and subjected to strong compression in a hydraulic press, as, for example, to 14,000 pounds' pressure per square inch. This pressure densifies the segments, flattens irregularities of both faces to give plane surfaces, and forces cementitious material into the spaces between the colored particles in the grooves. Actually, the cementitious material fills only a part of the spaces between the colored particles, to produce elongated areas or veins in which the cementitious material is present in amount sufficient to secure the granules in position, but insufficient to fill the veins level with the tops of the intervening areas. The result is a product of generally plane surface provided with the veins. The densified segments are removed from the press and are permitted to stand until the cement is thoroughly hardened, the metal plates being removed after the cement has taken an initial set. These operations are not shown, since they are conventional in the manufacture of shingles of the rigid asbestos type. The segments thus formed are ordinarily somewhat wider than the width of two shingles and are finally divided and trimmed to size, to produce individual shingles such as illustrated in Figs. 6 and 7, say, of size 17 x 12, 17 x 7, or 17 x 5 inches, of thickness approximately one-fourth inch at the butt end 30 and one-eighth inch at the thin end 31. Perforations 32 are provided, as by punching in conventional manner, for use as nail holes in assembling the shingles in a roof structure.

The products of the present invention have a number of interesting features in addition to those that have been already mentioned. They contain colored particles that are more concentrated in certain elongated areas than in other parts of the unit, to give the architecturally pleasing effect of veins in an otherwise smooth or plane surface. This effect is obtained without such lessening of strength as would be produced, for example, by scoring a shingle to create the appearance of irregularity of surface. The colored particles or flakes are thoroughly imbedded in the veins, due to the inflow of matrix material between the particles, during the densifying operation. The veins may be provided in various arrangements and shapes. They may be more or less regular or highly irregular, to suit the needs of a given structure. The veins may be of substantial and variable width and depth. Thus, veins about one-eighth inch wide and one-eighth inch or slightly less in greatest depth or thickness have been used. The veins are preferably substantially less in width than the width of the intervening areas of plane surface, as illustrated. The veins detract from the conspicuousness of undesired variations in the matrix, such as differences of color. Although grained more or less like wood, for example, the shingles are incombustible and resistant to the atmosphere. The veins of granular material, denoted by 26 in Figs. 5 and 6, contain spaces between the granules and are adapted, therefore, to facilitate drainage of water falling upon the shingle. In a roof comprising overlapping shingles it is desirable to minimize the flow of rain water from the side edge of one shingle onto the underlying shingle, inasmuch as water flowing over the edge of a shingle may reach the joint in the underlying course of shingles. Since the veins extend in the general direction of the longer dimension of the shingle, these veins in shingles on a roof tend to facilitate drainage in the desired manner, that is, toward the lower end of the shingle. Furthermore, as will be seen particularly from Fig. 7, the asbestos-cement composition that establishes the form and gives strength to the structure is substantially thicker in a plurality of areas than in the alternating areas, to form depressions in which the colored material is concentrated. The effect upon the breaking strength of the finished product for a given average thickness of layer of asbestos-cement composition is favorable, there being obtained, in substance, the effect of a corrugated structure and consequent increase of strength. At the same time, the colored granules fill the depressions and maintain a substantially plane upper surface of the unit.

Further, the process of manufacture of the shingles is rapid and economical. Aside from forming the grooves into which the colored slate or the like may tumble later, there is practically no operating expense additional to that incurred in a conventional process. The product resulting from the final sizing of the hardened segments and perforating the resulting units is ready for sale as a shingle, without any subsequent treatment and without removing anything, such as a filler, therefrom.

While the invention has been described with particular reference to the provision of veins of colored material in shingles known commercially as rigid asbestos shingles, the invention is applicable generally to the provision of such veins in materials, such as structural units, which are readily deformable at one stage of their manufacture and are subsequently hardened.

The details that have been given are for the purpose of illustration and not restriction of the invention. It is intended, therefore, that the invention should be limited only by the terms of the claims interpreted as broadly as consistent with novelty over the prior art.

What I claim is:

1. A rigid structural unit comprising a matrix and colored particles embedded therein, the said particles being more concentrated in certain elongated areas than in other parts of the unit and the said areas being of lesser width than the intervening areas and being adapted to facilitate drainage.

2. An asbestos and Portland cement shingle comprising colored particles of slate or the like embedded in portions thereof to form veins of appearance different from that of the rest of the shingle and adapted to facilitate drainage in the said veins.

3. An asbestos and Portland cement shingle comprising colored particles of slate or the like embedded therein, the said colored particles being concentrated largely in irregularly extending veins of substantial depth, being held firmly therein, and adapted to facilitate drainage in the said veins.

4. An asbestos and Portland cement shingle comprising colored particles of slate or the like embedded in portions thereof to form veins of appearance different from that of the rest of the shingle, and other colored particles of the same kind in spaced relationship to each other and in positions between the veins, the said veins providing drainage channels.

WALTER McQUADE.